Dec. 12, 1961  H. S. McCONKIE  3,012,600
SAFETY INNER TUBE WITH MEANS FOR SECURING SAME
TO WHEEL RIM AND WHEEL ASSEMBLY THEREWITH
Filed July 28, 1958

INVENTOR
HOWARD S. McCONKIE
BY
ATTORNEY

United States Patent Office 3,012,600
Patented Dec. 12, 1961

3,012,600
SAFETY INNER TUBE WITH MEANS FOR SECURING SAME TO WHEEL RIM AND WHEEL ASSEMBLY THEREWITH
Howard S. McConkie, Fort Bragg, N.C.
(101 Etter St., Hot Springs, Ark.)
Filed July 28, 1958, Ser. No. 751,533
10 Claims. (Cl. 152—349)

This invention relates to tires and more particularly to improved tubes of the inner or safety types, together with improved means and methods for mounting such tubes in a wheel assembly.

The automobile and truck wheel rims in common use are of four types; the removable edge rim, the split rim, the clincher rim, and the drop center rim. Of these, the first two named are so constructed that an inner tube can be mounted on the rim without stretching and when inflated, consequently fits the rim closely and tightly. The last two named types of rims, however, require stretching of the inner tube over the outwardly extending rim flanges which seat or seal the tire. With these types of rims, particularly the drop center, the fit of the inner tube against the rim, even when inflated, is loose enough to permit sudden movement and creep. The relative movement of the tube with respect to the rim and the tire, particularly at high speeds, or when the tire bumps into obstacles such as a curbstone, causes chafing and wear of the tube or safety member, tends to pull out the valve stem and destroys the wheel balance, setting up vibrations which endanger the comfort and safety of the vehicle passengers.

To avoid these objections and to protect the tube or safety member from pinching and undue wear at the rim flanges and tire beads, it has been suggested that reinforced tire safety members be used and that these be cemented or otherwise permanently secured to the rim. Such practice has the obvious disadvantage that once the tire is punctured and repair is necessary, the safety member or tube must be destroyed in an effort to dismount the tire and tube for their repair.

It is the primary object of the invention to provide a safety member or inner tube which is large enough to easily mount on any type rim, which is tightly but removably secured to the rim in such a manner as to prevent or reduce displacement, chafing and imbalance, and which is reinforced to minimize wear but is nevertheless capable of expanding to fill the tire and render safety in the event of blowout of the tire without sacrificing the comfort and other qualities of the ride and performance of the tire.

Another object is to provide a reinforced, safety tube which is securely positioned within a tire to retain its balance and stability, enabling the tire to run smoothly without objectionable vibration, and which is yet removable to permit dismounting, repair and reuse of the tube.

A further object is to provide a safety tube for tubeless type tires which is easy to mount and secure to the rim and to inflate, and which enables the tire itself to be more easily mounted and inflated.

Yet another object is to provide a safety tube whose inner circumference is larger than the rim circumference, and having means for shortening the tube circumference to fit closely about and removably clamp the wheel rim.

The novel features that are considered characteristic of the invention are set forth with particularity in the appended claims. The invention itself, however, both as to its organization and its method of operation, together with additional objects and advantages thereof, will best be understood from the following description of several embodiments when read in connection with the accompanying drawings, wherein like reference characters indicate like parts throughout the several figures and in which:

Figure 1:
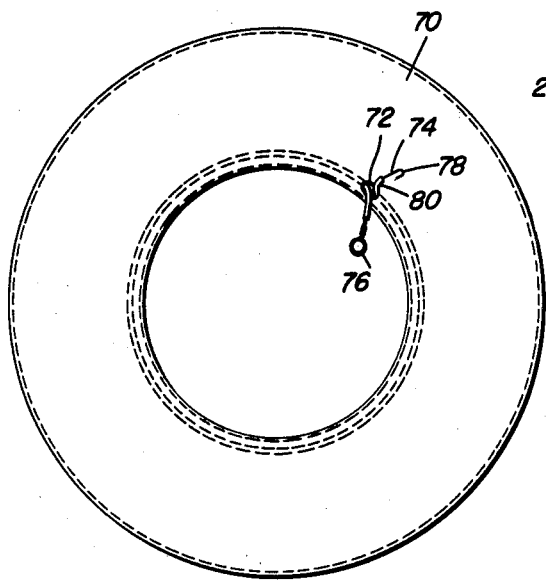
FIG. 1 is a plan view of an inner tube having a shortening means according to the invention applied thereto.
Figure 2:
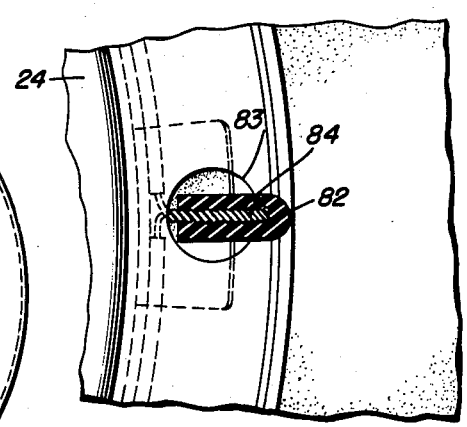
FIG. 2 is a fragmentary plan view of the tube of FIG. 1 mounted on a rim.

In FIGS. 1 and 2 is illustrated an embodiment of the invention in which a conventional, toroidal, completely extensible tube 70, without nonextensible fabric reinforcement portions, may be secured to a wheel rim 24 within a tire of either the tubeless or tubed type. In mounting tube 70 after the inside tire bead is positioned properly on the rim, the operator will first cut an opening 72 if the tube is not manufactured with such. An elongated flexible member 74 is then inserted in aperture 72, threaded through the entire interior of the tube, and the lead end pulled back out through the aperture 72, as shown in FIG. 1. This particular member 74 may be used as the tightening means or it can be used to pull another means back through the entire tube. The ultimate means will still be treated here as member 74. It may be bonded to soft rubber so as not to damage the tube.

Preferably, the member 74 is formed of a copper, steel or piano wire, or of a coil spring, or of a strong elastic band, or plastic or other flexible material, and is covered by a protective tubing 80. The tube 70 is then mounted on the rim 24 and the finger ring 76 at one end of member 74 and hook 78 at the other end are grasped and pulled by the operator to shorten the member 74 and force the tube tightly against the rim 24. The ends of the member 74 are then either hooked together or secured such as by twisting together as shown at 84, FIG. 2, and the excess length is snipped off. A protective tube 82 of rubber or plastic material is slipped over the end twist 84 which is then pushed back within the tube and bent to lie parallel to the rim circumference. The tube aperture 72 is sealed by a patch 83 vulcanized to the tube. The outer tire bead is then mounted on the rim and over the tube 70. Upon inflation of the tube, the tire is ready for use either as the operational air container or as a safety tube. When tubeless type tires are used inflation of the tube squeezes the periphery of the tire and forces the tire flanges into air sealing contact with the rim flanges rendering unnecessary the use of special compression tools to squeeze the tire. To remove the tube for repair or other purpose, the tire and tube are deflated and the tire outer bead is removed. The twisted ends 84 of member 74 are untwisted and the member is loosened or pulled out of the tube, after removal of patch 83, to permit removal of the tube from the rim. The tire inner or second bead is then removed. After repair of the tube, the tube may be reinstalled on the rim by utilizing another flexible member 74, and repeating the mounting method previously described.

Figure 3:
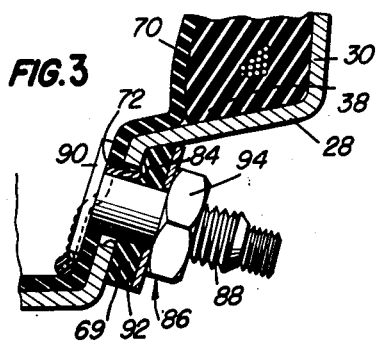
FIG. 3 is a fragmentary cross-sectional view showing an additional construction for securing the inner tube of FIG. 1 to a rim at the rim valve stem opening.

FIG. 3 illustrates the use of the tube of FIG. 1 when applied to a wheel assembly having a tire of the tubeless type. In this embodiment, the rim 24 is provided with a valve stem aperture 69 for receipt of the valve assembly 86 which services the tube 70. The valve assembly 86 comprises a threaded metal stem 88 having a flange 90 at its inner end, which may be inserted edgewise into the aperture 72 of the tube by stretching the latter. A resilient washer, not shown, may encircle stem 88 and, likewise, be inserted into the aperture 72 of the tube. The twisted wire ends 84 and the valve stem 88 are then inserted into the rim aperture 69 from the inside of the rim. The twisted ends 84 are bent to lie alongside the rim, and a resilient washer 92 is placed over the valve stem 88. The nut 94 threaded on the valve stem is then taken up to compress the washer 92 and seal aperture 69 around the ends 84 on member 74. The tightening of nut 94 also exerts compressive force through flange 90 on the wall of the tube surrounding the tube opening 72, so that a tight air seal of the inner tube against the inner surface of the rim and around the valve stem 88 is obtained.

To remove tube 70 from rim 24, the nut 94 is unthreaded and washer 92 is removed. The twisted ends 84 and the valve stem 88 are then withdrawn inwardly from the rim opening 69. The valve stem 88 may then be removed from the tube 70 by stretching the tube aperture 72 to release the flange 90. At this time, the ends 84 of the wire 74 are untwisted and the wire removed from the inner tube to permit removal of the latter from the rim. After repair of the inner tube, it may be reinstalled by use of another member 74.

It will be apparent that the tube of FIGS. 1–3 may be supplied as an article of manufacture with a wire 74 or strong elastic band or tape of nylon or a long coil spring whose coils are of less diameter than the width of the channel of the drop center rim placed in said tube during its manufacture. Since coil springs possess far greater extensibility than rubber, it is feasible to place within a tube a free moving unattached coil spring formed into a circle with ends substantially permanently joined, such circle being relatively small in circumference so that the inner periphery of the tube before mounting is highly pucked up into folds. When placed over a rim edge both tube and spring will give sufficiently and as seated on the bottom of a drop center rim channel, the tube may be smooth without tension and the spring on the other hand, be under sufficient tension to hold the tube's inner periphery securely to the rim. This spring can be assembled with numerous short lengths of rubber tubing so that when shortened about the rim the spring exerts its pressure on the tube through the same.

Figure 4:
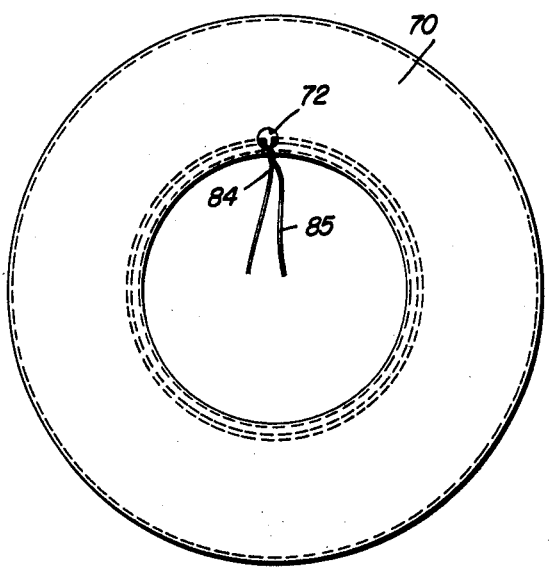
FIG. 4 is a reduced plan view similar to FIG. 1 showing an extension added to the tube shortening means.
Figure 5:
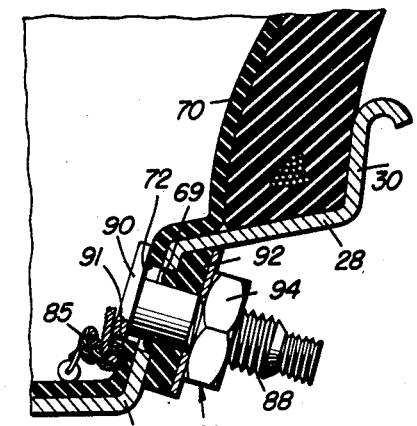
FIG. 5 is a cross-sectional view similar to FIG. 2 showing the tube of FIG. 4 secured to the rim valve stem opening.

The junction of the ends 84 of the means used to tighten the tube down to the rim may be kept near the tube aperture 72 by an extension of cord or wire 85, FIGS. 4 and 5, from such junction and tied around the valve stem 88 near its flange 90, or tied through a small hole 91, FIG. 5, in the flange 90 or to a projection on said flange; and then, as the valve flange 90 is inserted in the tube aperture 72, this connecting cord or wire 85 also is shoved back inside the tube. These details are advisable so that such shortening means can be unhooked or otherwise separated to permit its extension and enable the tube's inner periphery to be extended and allow the tube to be removed over the edges of the rim. Where a cut has been made in the tube to insert these securing means, these locating cords can be incorporated in the vulcanization patch to assure ease in locating the connecting devices.

Each of the described means and methods of mounting will firmly secure the tube to the rim during use on a vehicle in motion in spite of centrifugal forces, but permits the ready removal of the tube for repair, and reuse of the tube after repair. Tubes may be balanced when manufactured, or the mounted tire, tube, wheel rim assembly balanced before or after inflation by any accepted means of the trade.

Although certain specific embodiments of the invention have been shown and described, it is obvious that many modifications thereof are possible. The invention, therefore, is not to be restricted except insofar as is necessitated by the prior art and by the spirit of the appended claims.

What is claimed and desired to be secured by Letters Patent is:

1. In combination with a tire and a wheel rim having outwardly extending flanged sides to receive the edges of the tire, a separate distensible endless tube capable of filling the entire space within the tire and mounted on the rim and within the tire, and flexible means, other than the fluid pressure within the tube, for removably securing the inner perimeter of said tube tightly to the rim over a substantial portion of the rim periphery, said means being adjustable to accommodate tire rims of various size and comprising a length of flexible material inserted into said tube through an opening therein and extending completely through the length of the tube and out the same opening, the ends of said length of material being twisted together to shorten the material and tube and clamp the tube to the rim.

2. The combination according to claim 1 wherein said length of material comprises wire.

3. The combination according to claim 2 wherein said wire is surrounded in a tube protective sleeve.

4. The combination according to claim 3 wherein said twisted ends of the wire securing member passes outwardly through aligned valve openings in said tube and rim, said openings being closed in air sealing manner by a valve stem having an internal flange seated within the tube, a compressible external gasket and a compression member adapted to seal both the tube and rim apertures.

5. The method of installing a pneumatic tire on a rim which comprises, mounting the tube on the rim, cutting or using an existing aperture in the tube, inserting an elongated flexible member in said aperture and threading it through the length of the tube until it emerges through said aperture, twisting the ends of said flexible member together to tighten the tube on said rim, cutting off the extra length of said member, vulcanizing said tube aperture to seal the same, mounting said tire on the rim about said tube, and inflating said tube to partially or completely fill said tire.

6. As an article of manufacture, an extensible tube adapted to be mounted on a wheel rim and securely fastened thereto, an aperture in the wall of said tube, an elongated flexible member within the tube and extending for its entire length, the ends of said flexible member protruding from the tube through said aperture and being adapted to be pulled to shorten the member and to clamp the tube tightly to said wheel rim.

7. In combination with a tire and a wheel rim having outwardly extending flanged sides to receive the edges of the tire, a separate distensible endless tube capable of filling the entire space within the tire and mounted on the rim and within the tire, and flexible means, other than the fluid pressure within the tube, for removably securing the inner perimeter of said tube tightly to the rim over a substantial portion of the rim periphery, said means being adjustable to accommodate tire rims of various size and comprising a length of flexible material inserted into said tube through an opening therein and extending completely through the length of the tube and out the same opening, the ends of said length of material being drawn tightly toward and secured to one another so as to clamp the tube to the rim.

8. The combination according to claim 3 wherein said rim is provided with a valve opening aligned with said opening of the tube, said openings being closed in air sealing manner by a valve stem having an internal flange seated within the tube opening, a compressible external gasket and a compression member sealing both the tube and rim openings, an aperture in said valve stem flange, and said twisted ends of wire being secured to the valve stem through said aperture.

9. The combination according to claim 3 wherein said rim is provided with a valve opening aligned with said opening of the tube, said openings being closed in air sealing manner by a valve stem having an internal flange seated within the tube opening, a compressible external gasket and a compression member sealing both the tube and rim openings, an extension member connected to said twisted ends of wire and leading from the junction of the ends to the base of said valve stem, and said extension member being secured to the valve stem.

10. The method of installing a tubed tire on a rim which comprises, mounting the tube on the rim, cutting an aperture in the tube if not already provided therewith, inserting an elongated flexible member in said aperture and threading it through the length of the tube until it emerges through said aperture, securing the ends of said flexible member to one another to tighten the tube on said rim, sealing the said aperture, mounting said tire on the rim about said tube, and inflating said tube.

References Cited in the file of this patent

UNITED STATES PATENTS

| | | |
|---|---|---|
| 596,701 | Griswold | Jan. 4, 1898 |
| 616,516 | Wilson | Dec. 27, 1898 |
| 1,356,537 | McFate | Oct. 26, 1920 |
| 2,067,545 | Richketts | Jan. 12, 1937 |
| 2,802,504 | Lyon | Aug. 13, 1957 |

FOREIGN PATENTS

| | | |
|---|---|---|
| 2,274 | Great Britain | of 1891 |